United States Patent [19]

Tachi et al.

[11] Patent Number: 4,865,827

[45] Date of Patent: Sep. 12, 1989

[54] PROCESS FOR REMOVING NITROGEN OXIDES

[75] Inventors: Takahiro Tachi; Hiroshi Kawagoshi; Akira Kato; Hisao Yamashita; Tomoichi Kamo; Shinpei Matsuda, all of Hitachi; Yasuyoshi Kato; Fumito Nakajima, both of Kure, all of Japan

[73] Assignee: Babcock-Hitachi Kabushiki Kaisha, Tokyo, Japan

[21] Appl. No.: 194,827

[22] Filed: May 17, 1988

[30] Foreign Application Priority Data

May 22, 1987 [JP] Japan .................. 62-125470

[51] Int. Cl.$^4$ .................. B01J 8/00; C01B 21/00
[52] U.S. Cl. ................................. 423/239
[58] Field of Search .................. 423/239, 239 A

[56] References Cited

U.S. PATENT DOCUMENTS 4,378,338  3/1983  Imanari et al. .................. 423/239

Primary Examiner—Gregory A. Heller
Attorney, Agent, or Firm—Fay, Sharpe, Beall, Fagan, Minnich & McKee

[57] ABSTRACT

A process for removing nitrogen oxides from exhaust gases containing at least nitrogen oxides and volatile metal compounds by the use of a catalyst having prevented activity reduction due to the volatile metal compounds and having a superior durability is provided, which process comprises contacting the exhaust gases with a catalyst containing $TiO_2$, a compound active to nitrogen oxides-removing reaction such as oxides of V, Cr, Mo, W, Fe, Co, Ni, Cu, Ce, etc. and/or sulfates thereof and a metal sulfate containing water of crystallization such as those of Al, Mg or Mn, in the presence of ammonia at 150° to 600° C.

12 Claims, 1 Drawing Sheet

PROCESS FOR REMOVING NITROGEN OXIDES

BACKGROUND OF THE INVENTION

1. Field of the Invention

This invention relates to a process for removing nitrogen oxides. More particularly it relates to a process for removing nitrogen oxides, which is difficult to cause reduction in the catalyst activity due to volatile metal compounds contained in exhaust gases, with a good efficiency.

2. Description of the Related Art

A process for removing nitrogen oxides ($NO_x$) contained in various exhaust gases by reducing the nitrogen oxides with ammonia ($NH_3$) is simple in the aspect of the system and is carried out with a good efficiency; hence the process has been a main current of denitration process for exhaust gases from various fixed sources, including boiler combustion exhaust gas. The process requires the so-called denitration catalyst for promoting the reaction of $NO_x$ with $NH_3$, and various inventions therefor have so far been made. Among such catalysts, those which have been currently and practically used are catalysts containing titanium oxide ($TiO_2$) as a main component and having added thereto oxides and/or sulfates of vanadium (V), molybdenum (Mo), tungsten (W), iron, etc. represented by those disclosed in Japanese patent application laid-open Nos. Sho 50-51966/1975 and Sho 52-122293/1977. These catalysts are difficultly deteriorated even when sulfur oxides are contained in exhaust gases and exhibit high denitration properties; hence they are superior catalysts.

However, as to these catalysts, reduction in the catalyst activity due to volatile metal compounds formed mainly from mineral components contained in fuels, that is, oxides of selenium, tellurium, tharium, arsenic, etc. or reaction products thereof with alkali metals, alkaline earth metals, etc., has not been taken into consideration.

Thus, a new problem has been raised that when the above catalysts are used for denitrating exhaust gases having a tendency that the concentration of the above volatile compounds in exhaust gases has been increasing due to use in recent years of coal or petroleum containing a large quantity of mineral substances, the catalyst activity is reduced to a large extent.

SUMMARY OF THE INVENTION

The object of the present invention is to provide a catalyst having prevented the activity reduction due to volatile metal compounds contained in exhaust gases, as observed when the above conventional denitration catalysts are used, and having a superior durability.

The present invention resides in;

a process for removing nitrogen oxides from exhaust gases containing at least nitrogen oxides and volatile metal compounds, which process comprises containing said exhaust gases with a catalyst containing titanium oxide, a component active to nitrogen oxides-removing reaction and a metal sulfate containing water of crystallization in the presence of ammonia at a temperature of 150° to 600° C.

DETAILED DESCRIPTION OF PREFERRED EMBODIMENTS

Figure 1:
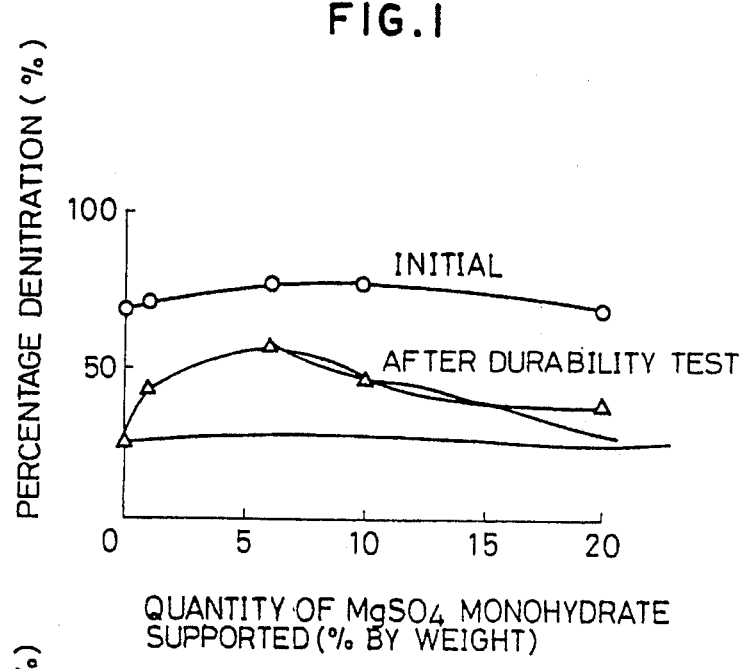
FIG. 1 shows a chart illustrating the initial performance and the activity after durability test of catalysts of Examples 1 to 4 and Comparative exmaple 1.

As described above, the catalyst used in the process of the present invention contains titanium oxide as a first component, at least one kind of a component which is active for the catalyst for removing nitrogen oxides, as a second component, and at least one kind of a metal sulfate having water of crystallization as a third component.

It has been found by precise experiments that the catalyst of the present invention is far less in the activity reduction due to volatile metal compounds than catalysts containing no metal sulfate having water of crystallization. Further, it has also been found that the catalyst effect is less in the form of the metal sulfate having no water of crystallization. The reason is at present unclear, but it is considered that the water of crystallization plays a role of inhibiting the active sites for the denitration reaction from being poisoned by adsorption of volatile compounds. In fact, it has been found that when the catalyst having added a metal sulfate having water of crystallization is used, the amount of volatile metal compounds adsorbed onto the catalyst is reduced.

The metal sulfate in the catalyst of the present invention is preferred to be at least one kind of metal sulfates selected from among those of Al, Mg and Mn. As to the form of these sulfates in the catalyst, as far as it is of the mono- or more hydrates of the sulfates, even polyhydrates may be used, but anhydrous form is not preferred. Thus, those which are sulfates of the form containing water of crystallization at the time of catalyst preparation, but are decomposed into anhydrous salts under denitration conditions such as temperature and gas atmosphere, are not preferred. On the other hand, a case may be considered where the sulfate is contrarily in the form of anhydrous sulfate when the catalyst begins to be used, but the sulfate absorbs steam contained in exhaust gases during use of the catalyst for denitration reaction and is converted into a form containing water of crystallization. In this case, however, the catalyst is successively poisoned by volatile metal compounds during its conversion into hydrous sulfate; hence such a case, too, is not preferred. Namely, it is most desired that the sulfate be present in the form of its hydrate at the last period of the catalyst preparation and also it be present in the form of its hydrate during the denitration reaction.

The content of the metal sulfate hydrate in the catalyst of the present invention is preferably 1 to 30% by weight, more preferably 5 to 15% by weight. If it is less than 1% by weight, the addition effect of the sulfate hydrate is insufficient, while if it exceeds 30% by weight, the catalyst activity itself decreases.

Further, it is necessary for the catalyst used in the process of the present invention to contain $TiO_2$ as a first component and at least one kind of a component exhibiting activity to the denitration reaction as a second component. As to this second component, any compound may be used as far as it exhibits activity to the denitration reaction. Examples of the compounds so far known are oxides and/or sulfates of V, Or, Mo, W, Fe, Co, Ni, Cu, Ce, etc. Further, in the catalyst of the present invention, the atomic ratio of Ti to the metal component of the second component is preferred to be in the range of 99:1 to 70:30 in the aspect of denitration performance and durability.

As to the process for producing the catalyst used in the process of the present invention, it is preferred to calcine a mixture of $TiO_2$ with a component having denitration activity, as the second component at 300° C. or higher in advance, followed by adding an aqueous solution of a metal sulfate as a third component and calcine the resulting mixture at 300° C. or higher. A process of simultaneously adding the first component, the second component and the third component from the beginning is possible, but somewhat inferior in the catalyst performance to the above-mentioned process.

As to the catalyst preparation of the present invention, any of precipitation method, kneading method, impregnation method, etc. employed for conventional preparation may be employed and there is no particular limitation thereto. Of course, as the addition method of the metal sulfate having water of crystallization as the third component, kneading method, impregnation method, etc. may also be employed.

As to the form of the catalyst, pellet-form, honeycomb-form, plate-form, etc. may be employed. Of course, materials prepared by applying the catalyst onto a reticular metal substrate, ceramic substrate, etc. or by coating the catalyst onto honeycomb-form ceramics may also be employed.

The temperature at which the denitration reaction is carried out using the catalyst of the present invention varies depending on the catalyst components, but it is preferably in the range of 150° to 600° C., more preferably in the range of 200° to 550° C. Outside the temperature range of 150° to 600° C., the denitration activity decreases.

The present invention will be described in more detail by way of Examples.

EXAMPLE 1

The catalyst used in the process of the invention was prepared as follows:

Titanium tetrachloride ($TiCl_4$) (500 g) was dissolved in distilled water (about 1 l), followed by neutralization the solution with 5N aqueous ammonia (about 2 l) to form precipitates, sufficiently washing the precipitates by decantation, filtering off the precipitates, adding a solution of ammonium paramolybdate (54 g) in hot water (500 ml) to the precipitates, sufficiently mixing these materials by means of a mixing and grinding machine, drying the resulting slurry, adding 1% by weight of graphite, further well mixing these materials, tabletting the mixture into tablets of 6 mm in diameter and 6 mm high, and calcining the tablets at 500° C. for 2 hours. The resulting molded product contains titanium and molybdenum in an atomic ratio of Ti:Mo=9:1. It was then ground into particles of 10 to 20 meshes, followed by having 100 g of the particles impregnated with an aqueous solution of magnesium sulfate heptahydrate (5.2 g), thereafter drying the resulting material at 120° C. for 5 hours, and calcining it at 500° C. for 2 hours to obtain Example catalyst 1. This catalyst contained 6% by weight of magnesium sulfate monohydrate.

EXAMPLES 2 TO 4

The quantity of magnesium sulfate monohydrate supported in Example 1 was varied to 1% by weight, 10% by weight and 20% by weight, and Example catalysts 2 to 4 were obtained in the same manner as in Example 1.

COMPARATIVE EXAMPLE 1

A titanium oxide-molybdenum oxide catalyst containing no magnesium sulfate in Example 1 was prepared to obtain Comparative example catalyst 1.

EXPERIMENTAL EXAMPLE 1

With the catalysts of Examples 1 to 4 and Comparative Example 1, durability tests were carried out using a model exhaust gas supposing combustion of coal having a high content of mineral substances. As a catalyst poison component, $SO_3$ and $As_2O_3$ which are oxidation products of arsenopyrite generally known as a mineral substance contained in coal were added in the form of vapor into the above gas. Test conditions are shown in Table 1.

TABLE 1

| Item | Conditions |
|---|---|
| Gas composition | |
| NO | 300 ppm |
| $NH_3$ | 360 " |
| $SO_2$ | 500 " |
| $SO_3$ | 50 " |
| $As_2O_3$ | 140 " |
| $CO_2$ | 12% |
| $H_2O$ | 12% |
| $O_2$ | 3% |
| $N_2$ | Remainder |
| Temperature | 350° C. |
| SV | 120,000 $h^{-1}$ |
| Catalyst form | 10-20 mesh, granular |

The above durability tests were carried out for 30 minutes. The measurement was carried out employing a fixed bed reaction apparatus through which gases having an atmospheric pressure are passed. The reaction tube in the apparatus was a silica glass tube having an inner diameter of 20 mm and contained therein a silica tube having an outer diameter of 5 mm for protecting a thermocouple therein. This reaction tube was heated in an electric oven and the temperature was measured by the thermocouple. About 2 ml of a catalyst subjected to be controlled so as to give particles of 10 to 20 meshes was filled in the central part of the reaction tube and durability tests were carried out under conditions indicated in Table 1. $NO_x$ analysis was carried out employing a $NO_x$ analyzer of chemiluminescence mode and the percentage denitration was determined by the following equation:

$$\text{Percentage NO}_x \text{ removal} = \left(1 - \frac{\text{Exit NO}_x}{\text{Inlet NO}_x}\right) \times 100\%$$

FIG. 1 shows a chart wherein the initial activities of catalysts of Examples 1 to 4 and Comparative Example 1 and activities of the catalysts after the durability tests were plotted relative to the contents of magnesium sulfate. It is seen from FIG. 1 that the catalyst of the present invention has a high activity and is resistant to deterioration.

Figure 2:
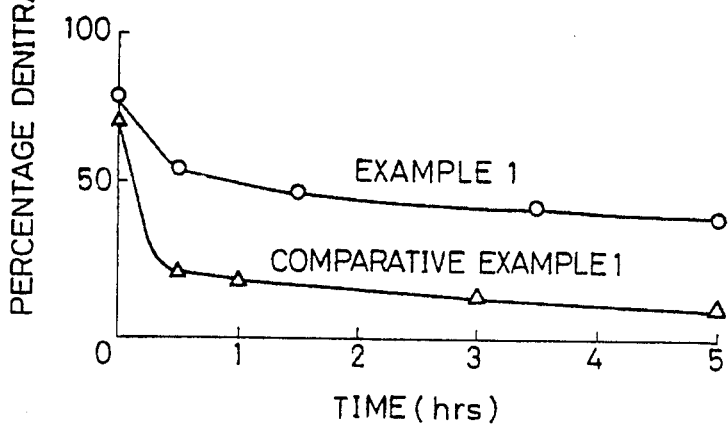
FIG. 2 shows a chart illustrating the change with lapse of time in the denitration performance at the time of durability test of catalysts of Example 1 and Comparative Example 1.

Further, FIG. 2 shows a chart wherein change in the activity reduction of catalysts of Example 1 and Comparative Example 1 with lapse of time due to the durability tests is shown. It is seen that the catalyst of the present invention is improved in the durability as compared with the conventional catalyst shown in Comparative Example 1.

EXAMPLE 5

This Example was carried out in the same manner as in Example 1 except that ammonium paramolybdate in Example 1 was replaced by ammonium paratungstate to prepare Example catalyst 5. This catalyst contained titanium and tungsten in the form of oxides and had an atomic ratio of Ti:W=9:1 and also contained 6% by weight of magnesium sulfate monohydrate based on the weight of the oxides.

EXAMPLE 6

This Example was carried out in the same manner as in Example 1 except that ammonium paramolybdate in Example 1 was replaced by ammonium metavanadate to prepare Example catalyst 6.

COMPARATIVE EXAMPLE 2

A titanium oxide-tungsten oxide catalyst containing no magnesium sulfate in Example 5 was prepared to obtain Comparative example catalyst 2.

COMPARATIVE EXAMPLE 3

A titanium oxide-vanadium oxide catalyst containing no magnesium sulfate in Example 6 was prepared to obtain Comparative example catalyst 3.

EXPERIMENTAL EXAMPLE 3

With the catalysts of Examples 5 and 6 and Comparative Examples 2 and 3, durability tests were carried out in the same manner as in Experimental Example 1. The results are shown in Table 3.

TABLE 3

| Catalyst | Percentage denitration (%) | |
|---|---|---|
| | Initial | After durability test |
| Example 5 | 75 | 53 |
| Example 6 | 82 | 57 |
| Comp. ex. 2 | 70 | 24 |
| Comp. ex. 3 | 78 | 21 |

EXAMPLE 7

A metatitanic acid slurry (100 g), ammonium paramolybdate (7.8 g), ammonium metavanadate (2.1 g) and manganese sulfate hexahydrate (3.4 g) were wet-kneaded in a mixing and grinding machine, followed by drying the mixture, adding 1% by weight of graphite, mixing these materials, molding them into tablets of 6 mm in diameter and 6 mm high and calcining the product at 400° C. for 2 hours into a complete catalyst to obtain Example catalyst 7. This catalyst contained titanium oxide, molybdenum oxide and vanadium oxide in an atomic ratio of the metal components of Ti:Mo:V=86:10:4, and contained 10% by weight of manganese sulfate monohydrate based on the weight of the Ti-Mo-V catalyst.

EXAMPLE 8

A metatitanic acid slurry (100 g), ammonium paramolybdate (7.4 g) and manganese sulfate hexahydrate (5.6 g) were wet-kneaded in a mixing and grinding machine, followed by drying the resulting powder, adding 1% by weight of graphite, mixing these materials, molding the mixture into tablets of 6 mm in diameter and 6 mm high, and calcining the molded product at 400° C. for 4 hours into a complete catalyst to obtain Example catalyst 8. This catalyst contained titanium and molybdenum in an atomic ratio of Ti:Mo=90:10, and contained 10% by weight of manganese sulfate monohydrate based on the weight of the Ti-Mo catalyst.

EXAMPLES 9–12

The content of manganese sulfate monohydrate in Example 7 was varied to 1% by weight, 5% by weight, 15% by weight and 20% by weight and Example catalysts 9 to 12 were obtained in the same manner as in Example 1.

COMPARATIVE EXAMPLE 4

A Ti-Mo-V catalyst having added no Mn in the catalyst used in Example 7 was named Comparative example catalyst 4.

EXPERIMENTAL EXAMPLE 4

With the catalysts of Examples 7 to 12 and Comparative Example 4, durability tests were carried out in the same manner as in Experimental Example 1. The results are shown in Table 4.

TABLE 4

| Catalyst | Percentage denitration (%) | |
|---|---|---|
| | Initial | After durability test |
| Example 7 | 87 | 58 |
| Example 8 | 79 | 52 |
| Example 9 | 89 | 50 |
| Example 10 | 88 | 56 |
| Example 11 | 86 | 54 |
| Example 12 | 84 | 50 |
| Comp. ex. 4 | 88 | 31 |

EXAMPLE 13

Example 7 was repeated except that aluminum sulfate hexahydrate was used as a starting raw material in place of manganese sulfate hexahydrate in Example 7 to prepare Example catalyst 13. This catalyst contained titanium, molybdenum and vanadium in the form of oxides and its atomic ratio was Ti:Mo:V=86:10:4. Further, the catalyst contained 10% by weight of aluminum sulfate monohydrate based on the weight of these oxides.

EXAMPLE 14

Example 8 was repeated except that iron oxide was used in place of ammonium paramolybdate in Example 8 to prepare Example catalyst 14. This catalyst contained titanium and iron in the form of oxides and its atomic ratio was Ti:Fe=9:1. Further, 10% by weight of manganese sulfate monohydrate based on the weight of the oxides was contained.

COMPARATIVE EXAMPLE 5

A Ti-Fe catalyst having added no Mn in the catalyst used in Example 14 was named Comparative example catalyst 5.

COMPARATIVE EXAMPLE 6

Example 1 was repeated except that barium sulfate was used in place of magnesium sulfate in Example 1 to prepare Comparative example catalyst 6.

COMPARATIVE EXAMPLE 7

Example 7 was repeated except that nickel sulfate was used in place of manganese sulfate in Exmaple 7 to obtain Comparative example catalyst 7.

EXPERIMENTAL EXAMPLE 5

With the catalysts of Examples 13 and 14 and Comparative Examples 5–7, durability tests were carried out in the same manner as in Experimental example 1. The results are shown in Table 5.

TABLE 5

| Catalyst | Percentage denitration (%) Initial | After durability test |
| --- | --- | --- |
| Example 13 | 87 | 58 |
| Example 14 | 80 | 51 |
| Comp. ex. 5 | 81 | 20 |
| Comp. ex. 6 | 78 | 31 |
| Comp. ex. 7 | 84 | 32 |

According to the present invention, in the process for removing nitrogen oxides in exhaust gases by contacting the gases with the catalyst, it is possible to prevent the catalyst from being poisoned by volatile metal compounds in exhaust gases and thereby treat exhaust gases containing a large quantity of volatile metal compounds such as Se, As, etc. to which conventional denitration catalysts could not have been applied due to their notable deterioration. Further, since the catalyst is small in deterioration and highly active, it is possible to reduce the quantity of the catalyst used.

What we claim is:

1. A process for removing nitrogen oxides from exhaust gases containing at least nitrogen oxides and volatile metal compounds, which process comprising contacting said exhaust gases in the presence of ammonia at a temperature of 150° to 600° C. with a catalyst containing
   titanium oxide;
   a component active to nitrogen oxides-removing reaction, the component selected from the group comprising oxides or sulfates of vanadium, chromium, chromium, molybdenum, tungsten, iron, cobalt, nickel, copper and cerium; and
   a metal sulfate containing water of crystallization, the metal selected from the group comprising aluminum, magnesium and manganese;
   wherein the atomic ratio of the titanium to the component active to nitrogen oxides-removing reaction ranges from 99:1 to 70:30, and the metal sulfate containing water of crystallization comprises 4–30% of the catalyst by weight.

2. A process for removing nitrogen oxides according to claim 1, wherein a mixture of $TiO_2$ with said component having denitration activity is calcined at 300° C. or higher, followed by adding an aqueous solution of said metal sulfate containing water of crystallization and calcining the resulting mixture at 300° C. or higher.

3. The process for removing nitrogen oxides according to claim 1 wherein the catalyst contacts exhaust gases at a temperature of 200° to 550° C.

4. The process for removing nitrogen oxides according to claim 1 wherein the metal sulfate containing water of crystallization comprises 5–15% of the catalyst by weight.

5. A process for removing nitrogen oxides from exhaust gases containing at least nitrogen oxides from volatile metal compounds, the process comprising contacting the exhaust gases in the presence of ammonia at a temperature of 150° to 600° C. with a catalyst containing:
   $TiO_2$;
   a component active to a nitrogen oxides-removing reaction selected from the group of metal components comprising Or, Mo, Fe, Co, Ni, Cu and Ce, wherein the atomic ratio of Ti to the metal component ranges from 99:1 to 70:30; and,
   a metal sulfate containing water of crystallization comprising 4–30% of the catalyst by weight, the metal component of the metal sulfate selected from the group comprising Al and Mn.

6. The process for removing nitrogen oxides from exhaust gases according to claim 5 wherein the component active to a nitrogen oxides-removing reaction is an oxide or sulfate of V.

7. The process for removing nitrogen oxides from exhaust gases according to claim 5 wherein the component active to a nitrogen oxides-removing reaction is an oxide or sulfate of W.

8. The process for removing nitrogen oxides from exhaust gases according to claim 5 wherein the metal component of the metal sulfate containing water of crystallization is Mg.

9. The process for removing nitrogen oxides from exhaust gases according to claim 5 wherein the metal sulfate containing water of crystallization comprises 5–15% of the catalyst by weight.

10. A process for removing nitrogen oxides from exhaust gases containing at least nitrogen oxides and volatile metal compounds, the process comprising contacting the exhaust gases in the presence of ammonia with a catalyst containing
    $TiO_2$;
    a component active to nitrogen oxides-removing reaction, the component selected from the group comprising oxides or sulfates of metals; and,
    a metal sulfate hydrate, the metal selected from the group comprising Al, Mg and Mn, wherein the atomic ratio of Ti to the component active to nitrogen oxides-removing reaction ranges from 99:1 to 70:30, and the metal sulfate hydrate comprises 4–30% of the catalyst by weight.

11. The process for removing nitrogen oxides from exhaust gases wherein the component active to nitrogen oxides-removing reaction is an oxide or sulfate of V or W.

12. The process for removing nitrogen oxides from exhaust gases according to claim 10 wherein the component active to nitrogen oxides-removing reaction is an oxide or sulfate of Cr, Mo, Fe, Co, Ni, Cu or Ce.

* * * * *